(12) United States Patent
Yeh et al.

(10) Patent No.: US 7,738,544 B2
(45) Date of Patent: Jun. 15, 2010

(54) APPARATUS AND METHOD FOR MEASURING RECEIVED SIGNAL STRENGTH INDICATOR, AND RECORDING MEDIUM STORING PROGRAM EMBODYING THE SAME METHOD

(75) Inventors: Choong-Il Yeh, Daejeon (KR); Hyoung-Soo Lim, Daejon (KR); Dong-Sung Kwon, Daejeon (KR)

(73) Assignees: Electronics & Telecommunications Research Institute (KR); Samsung Electronics Co., Ltd. (KR); KT Corporation (KR); SK Telecom Co., Ltd. (KR); KT Freetel Co., Ltd. (KR); Hanaro Telecom., Inc. (KR)

( * ) Notice: Subject to any disclaimer, the term of this patent is extended or adjusted under 35 U.S.C. 154(b) by 663 days.

(21) Appl. No.: 10/588,101

(22) PCT Filed: Jun. 23, 2004

(86) PCT No.: PCT/KR2004/001517

§ 371 (c)(1),
(2), (4) Date: Jun. 21, 2007

(87) PCT Pub. No.: WO2005/074174

PCT Pub. Date: Aug. 11, 2005

(65) Prior Publication Data

US 2007/0274377 A1    Nov. 29, 2007

(30) Foreign Application Priority Data

Jan. 30, 2004  (KR) .................... 10-2004-0006279
Jun. 23, 2004  (KR) .................... 10-2004-0046903

(51) Int. Cl.
*H04B 3/46* (2006.01)

(52) U.S. Cl. .................................................... 375/224

(58) Field of Classification Search ................. 375/224, 375/228; 455/226.2
See application file for complete search history.

(56) References Cited

U.S. PATENT DOCUMENTS

| 3,931,584 | A | | 1/1976 | Motley et al. |
|---|---|---|---|---|
| 5,465,408 | A | | 11/1995 | Sugayama et al. |
| 5,603,112 | A | * | 2/1997 | Gabato et al. ............ 455/226.2 |
| 5,675,339 | A | | 10/1997 | Andren et al. |
| 6,621,430 | B2 | * | 9/2003 | Mestdagh et al. ........... 341/118 |
| 6,965,630 | B1 | * | 11/2005 | Miller et al. ................ 375/130 |

FOREIGN PATENT DOCUMENTS

| EP | 1 085 668 A2 | 3/2001 |
|---|---|---|
| KR | 1020040005295 A | 1/2004 |
| WO | WO 01/74154 A1 | 6/2001 |

OTHER PUBLICATIONS

Choong-Il, Yeh et al., "RSSI Measurements", Dec. 26, 2003.

* cited by examiner

*Primary Examiner*—David C Payne
*Assistant Examiner*—Leon-Viet Q Nguyen
(74) *Attorney, Agent, or Firm*—The Farrell Law Firm, LLP (57) ABSTRACT

An apparatus for estimating a RSSI of a signal transmitted/received in a wireless network, the apparatus including an ADC quantizing one of I-branch and Q-branch signals, extracted from the signal, into a digital signal; an absolute value calculating unit calculating an absolute value of the digital signal quantized by the ADC and outputting a result; an accumulate unit accumulating an output of the absolute calculating unit for a given time period and outputting a result; a square unit squaring an output of the accumulate unit and outputting a result; and a multiply unit multiplying an output of the square unit by a given value and outputting a result, the given value being determined based on the number of input bits, an input clip level, and input resistance of the ADC when the probability density functions at input and output signals of the ADC are approximately Gaussian with zero mean.

17 Claims, 6 Drawing Sheets

APPARATUS AND METHOD FOR MEASURING RECEIVED SIGNAL STRENGTH INDICATOR, AND RECORDING MEDIUM STORING PROGRAM EMBODYING THE SAME METHOD

BACKGROUND OF THE INVENTION (a) Field of the Invention (b) Description of the Related Art The present invention relates to estimating a received signal strength indicator (RSSI), and more particularly relates to a simply realized RSSI estimating apparatus that estimates RSSI and a method thereof, and a recording medium storing a program that realizes the method.

In recent years, various mobile appliances and wireless networks have been developed to offer mobile networking and computing activities to users.

The most important role in wireless communication is to support mobility of users. In other words, a current channel is maintained for guaranteeing wireless communication services even though a mobile user moves from one place to another. To support mobility in wireless communication, RSSI plays an important role for detecting a level of a signal received at a mobile terminal. The RSSI may be used for various purposes.

Figure 1:
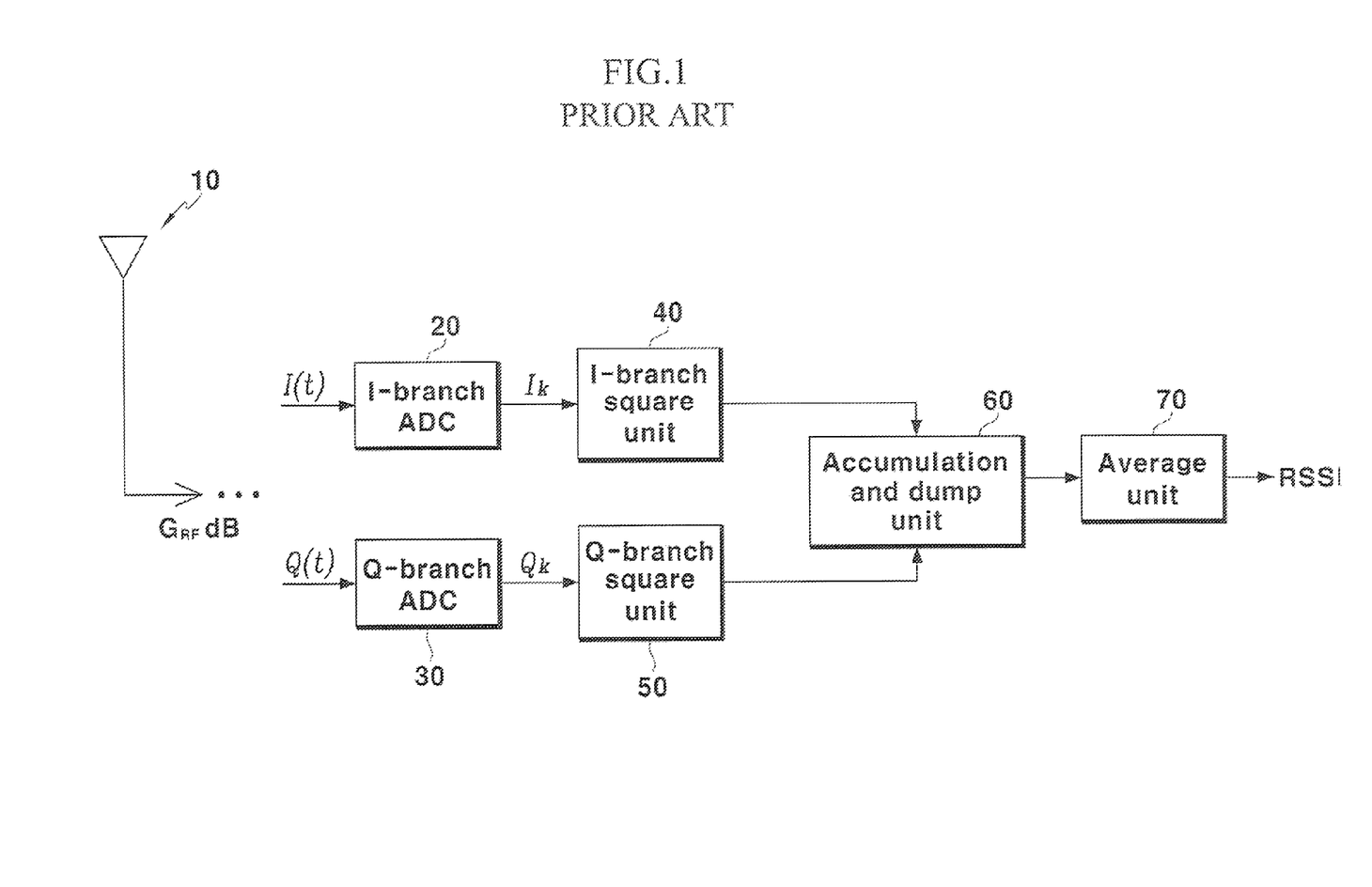
FIG. 1 is a block diagram of a conventional received signal strength indicator (RSSI) estimation apparatus.

FIG. 1 is a block diagram of a conventional RSSI estimation apparatus.

As shown in FIG. 1, the conventional RSSI estimation apparatus includes a receive antenna 10, an I-branch analogue/digital converter (ADC) 20, a Q-branch ADC 30, an I-branch square unit 40, a Q-branch square unit 50, an accumulating and dump unit 60, and an averaging unit 70.

Throughout the specification, "I-branch signal" and "Q-branch signal" respectively represent "in-Phase branch signal" and "Quadrature branch signal."

The receive antenna 10 receives a radio signal from a base station through a radio channel, and the I-branch and Q-branch ADCs 20 and 30 convert I-branch and Q-branch signals I(t) and Q(t) into the corresponding digital signals $I_k$ and $Q_k$ and output the digital signals $I_k$ and $Q_k$.

The I-branch and Q-branch square units 40 and 50 respectively square the digital signals $I_k$ and $Q_k$ output from the I-branch and Q-branch ADCs 20 and 30 and output the corresponding power signals.

The accumulating and dump unit 60 receives and gathers the power signals respectively output from the I-branch and Q-branch square units 40 and 50, and accumulates the gathered signals for a given time period.

The averaging unit 70 averages signals accumulated by the accumulating and dump unit 60, and outputs an RSSI estimation signal.

The RSSI obtained by the conventional RSSI estimation apparatus of FIG. 1 may be given by [Math Figure 1].

$$RSSI = \frac{1}{N}\sum_{k=0}^{N-1}(I_k^2 + Q_k^2) \quad \text{[Math Figure 1]}$$

where N denotes the number of samples accumulated by the accumulating and dump unit 60 within a given time period, and k denotes an order of the samples within the given period.

However, the RSSI estimated by the conventional RSSI estimation only satisfies a function relation with an actual RSSI, and thus we do not know the wattage of the estimated RSSI at a wireless communication terminal, and hardware complexity is increased since the I-branch and Q-branch square units 40 ad 50 require a multiplier for measuring wattage for each sample during a given time period.

Prior arts related to the foregoing ADC are disclosed in U.S. Pat. No. 5,675,339, entitled "A/D REFERENCE LEVEL ADJUSTMENT CIRCUIT TO MAINTAIN OPTIMUM DYNAMIC RANGE AT THE A/D," and U.S. Pat. No. 3,931,584, entitled "AUTOMATIC GAIN CONTROL."

The former prior art relates to a method for controlling a reference voltage of an ADC and a circuit thereof, and the method includes a sensor for indicating when outputs of the ADC are at least a desired voltage.

In addition, the method includes a processor responsive to the sensor and connected to a digital-to-analogue converter (DAC), which provides a reference voltage for the ADC. The processor provides signals to the DAC which change the reference voltage when an output voltage of an I- or Q-branch component is higher or lower than the reference voltage. However, the former prior art only proposes a method for providing an accurate reference voltage rather than proposing a method for simply measuring RSSI.

The latter prior art discloses a method for minimizing quantization noise of an ADC, and an automatic gain control (AGC) responsive to an input analogue signal having a significantly varying power level provides an output analogue signal of a substantially constant power level to thereby minimize quantization noise of the ADC. However, this method also does not propose a method for simply and accurately measuring an RSSI.

The above information disclosed in this Background section is only for enhancement of understanding of the background of the invention and therefore, it may contain information that does not form the prior art that is already known in this country to a person or ordinary skill in the art.

SUMMARY OF THE INVENTION

In one aspect of the present invention, in a received signal strength indication (RSSI) estimation apparatus estimating an RSSI of a signal received through a wireless network, the apparatus includes an analogue/digital converter (ADC), an absolute value calculating unit, an accumulate unit, a square unit, and a multiply unit. The ADC quantizes one of an I-branch signal and a Q-branch signal into a digital signal, the I-branch and Q-branch signals being extracted from a signal received through the wireless network. The absolute value calculating unit calculates an absolute value of the digital signal quantized by the ADC and outputs a calculation result. The accumulate unit accumulates an output of the absolute value calculating unit for a given time period and outputs an accumulated result. The square unit squares an output of the accumulate unit and outputs a squared result. The multiply unit multiplies an output of the square unit by a given value and outputs a multiplied result, the given value being determined based on the number of input bits, an input clip level, and an input resistance of the ADC when the probability density functions at input and output signals of the ADC are approximately Gaussian with zero mean.

In another aspect of the present invention, in an RSSI estimation apparatus for estimating an RSSI of a signal received through a wireless network, the apparatus includes an ADC, an absolute value calculating unit, an accumulate unit, and a computer system. The ADC quantizes one of an I-branch signal and a Q-branch signal into a digital signal, the I-branch and Q-branch signals being extracted from a signal received through the wireless network. The absolute value calculating unit calculates an absolute value of the digital signal quantized by the ADC and outputs a calculating result. The accumulate unit accumulates an output of the absolute value calculating unit for a given time period and outputs an accumulated result. The computer system estimates the RSSI of the received signal by performing multiplication of an output value of the accumulate unit and a given value, the given value being determined based on the number of input bits, an input clip level, and input resistance of the ADC when the probability density functions at input and output signals of the ADC are approximately Gaussian with zero mean.

The RSSI estimation apparatus further includes a receive antenna receiving a signal through a wireless network and outputting the received signal to the ADC, and the apparatus uses a gain from the receive antenna to the ADC when determining the given value.

In addition, variance of an output signal of the ADC is determined by multiplying variance of an input signal of the ADC and a value determined by the number of input bits and an input clip level of the ADC.

Power of the output signal of the ADC is determined based on variance of the output signal of the ADC.

In another aspect of the present invention, in a method for estimating a received signal strength indicator (RSSI) of a signal transmitted/received through a wireless network, the method includes a) receiving an accumulated value as an input to estimate an RSSI of a signal received through a wireless network, the accumulated value being obtained by quantizing one of I-branch and Q-branch signals extracted from the received signal into a digital signal, taking an absolute value of the digital signal, and accumulating the absolute value for a given time period; b) performing a squaring operation on the accumulated value; and c) estimating an RSSI of the received signal by performing a multiplication operation between a result of the squaring operation and a given value, the given value being determined based on the number of input bits, an input clip level, and input resistance of the ADC when the probability density functions at input and output signals of the ADC are approximately Gaussian with zero mean.

The method further includes, before a), extracting one of I-branch and Q-branch signals from the signal received through the wireless network and quantizing the extracted signal into the corresponding digital signal; calculating an absolute value of the quantized digital signal; and accumulating the absolute value for a given time period and outputting an accumulated result.

In the method, a gain from a receive antenna to the ADC is used when determining the given value. The receive antenna receives a signal through a wireless network and outputs the signal.

In another aspect of the present invention, a method for estimating a received signal strength indicator (RSSI) of an RSSI estimation apparatus having an analogue/digital converter (ADC) that quantizes a signal into a digital signal is provided, the signal being one of I-branch and Q-branch signals extracted from a signal received through a wireless network. Power at an input end of the ADC is determined by using the RSSI. The power at the input end is calculated using a signal at an output end of the ADC based on a first relation between variance of an output signal of the ADC and variance of an input signal of the ADC when the probability density functions at input and output signals of the ADC are approximately Gaussian with zero mean and a second relation between the power and the variance in the probability density functions as a Gaussian random variable.

DETAILED DESCRIPTION OF THE PREFERRED EMBODIMENTS

Accordingly, it is an advantage of the present invention to provide an RSSI estimation apparatus and a method thereof for measuring an exact amount of wattage of the estimated RSSI with simple hardware. The present invention also provides a recording medium for storing a program that realizes the method of the RSSI estimation apparatus.

An embodiment of the present invention will hereinafter be described in detail with reference to the accompanying drawings. In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

A received signal strength indicator (RSSI) estimation apparatus according to an exemplary embodiment of the present invention will now be described with reference to the accompanying drawings.

In a general wireless communication system, the probability density functions of input and output signals of the ADCs are approximately Gaussian with zero mean. In this instance, variance $$(\sigma^2_{I(t)})$$

of the input signal of the I-branch ADC 20 equals variance $$(\sigma^2_{I(t)})$$

of the input signal of the Q-branch ADC 30, and variance $$(\sigma^2_{I_k})$$

of the output signal of the I-branch ADC 20 equals variance $$(\sigma_{I_k}^2)$$

of the output signal of the Q-branch ADC 30. Therefore, [Math Figure 2] can be satisfied in the relation between the input/output signals of the I-branch and Q-branch ADCs 20 and 30.

$$\sigma_{I(t)}^2 = \sigma_{Q(t)}^2 = \sigma_i^2, \sigma_{I_k}^2 = \sigma_{Q_k}^2 = \sigma_o^2 \quad \text{[Math Figure 2]}$$

Meanwhile, input power $P_{in,ADC}$ at input ends of the respective ADCs 20 and 30 may be given by [Math Figure 3].

$$P_{in,ADC} = \frac{\sigma_{I(t)}^2}{R} + \frac{\sigma_{Q(t)}^2}{R} = \frac{2\sigma_i^2}{R} \text{ Watt} \quad \text{[Math Figure 3]}$$

where R denotes input resistances of the respective ADCs 20 and 30.

Figure 2:
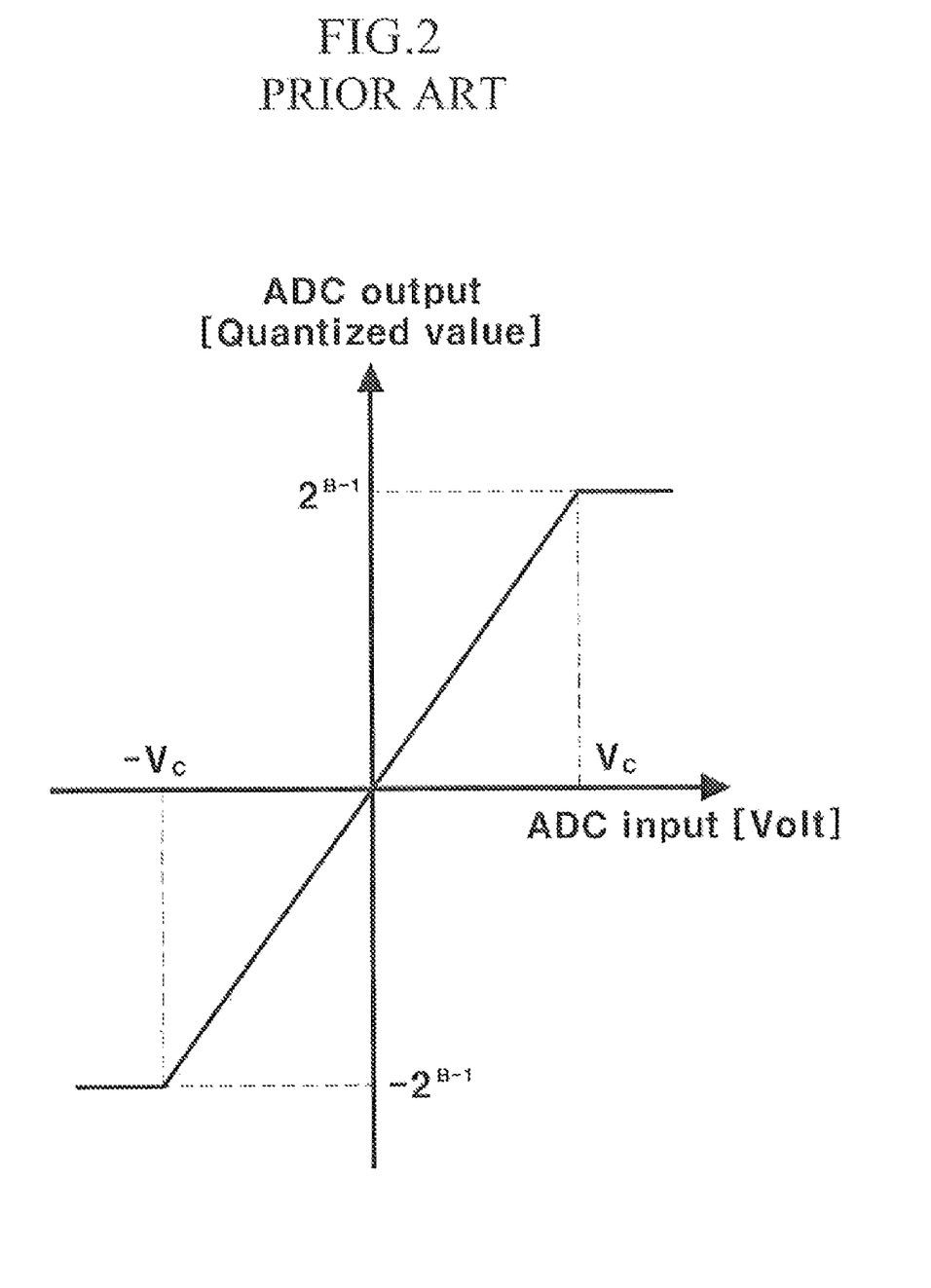
FIG. 2 illustrates a general input/output relation of an I-branch analogue/digital converter (ADC) and a Q-branch ADC of FIG. 1.

FIG. 2 illustrates a general input/output relation between the I-branch ADC 20 and the Q-branch ADC 30 of FIG. 1.

Referring to FIG. 2, if assuming that the resolution of the ADCs 20 and 30, that is, the number of input bits and input clip levels of the ADCs 20 and 30 to be B and Vc, respectively, a relation between $$\sigma_i^2 \text{ and } \sigma_o^2$$

of [Math Figure 2] is given by [Math Figure 4]. Here, the input clip levels of the ADCs 20 and 30 are levels at which outputs of the ADCs 20 and 30 become saturated.

$$\sigma_o^2 = k^2 \sigma_i^2 \quad \text{[Math Figure 4]}$$

$$\text{where } k = \frac{2^{B-1}}{V_c}.$$

Figure 5:
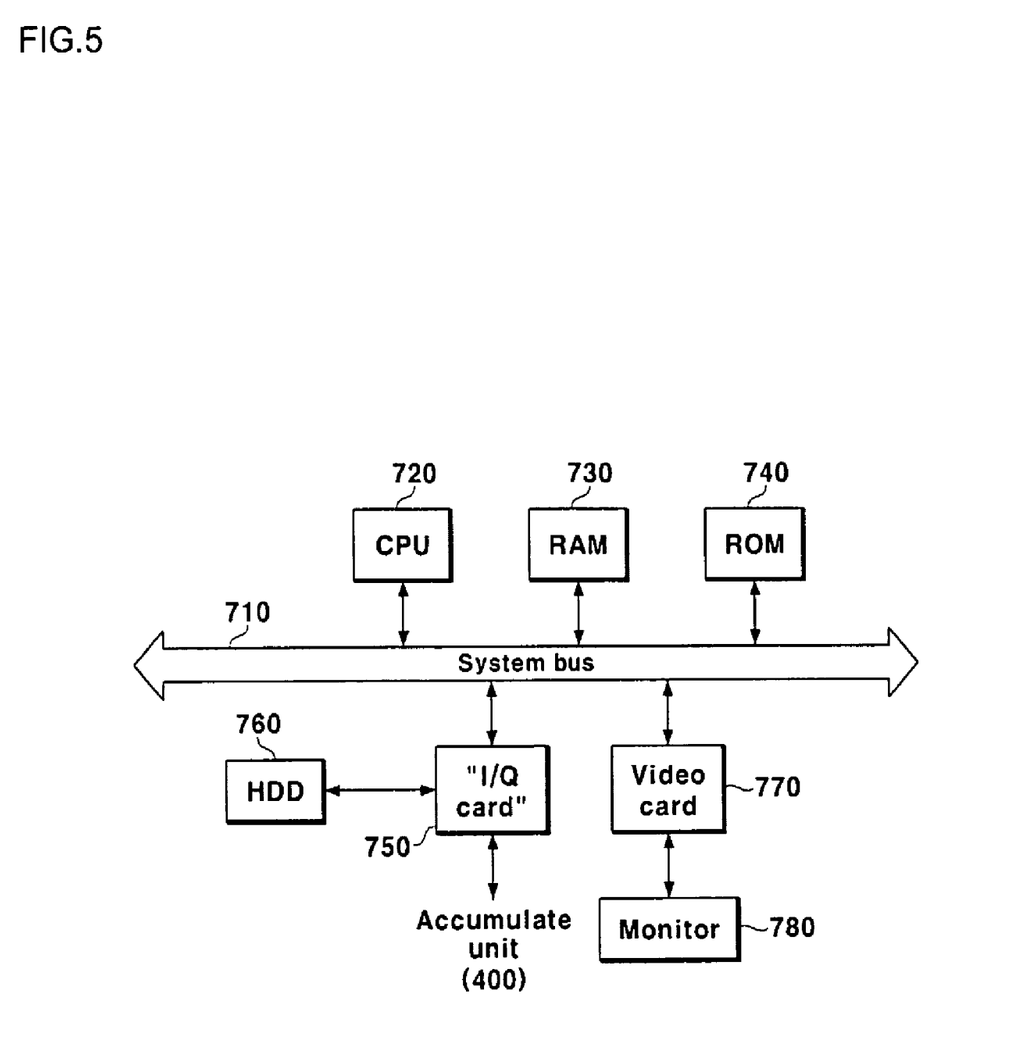
FIG. 5 is a block diagram of a computer system of FIG. 4 according to an exemplary embodiment of the present invention.

The probability density function for zero-mean Gaussian random variable Z may be given by [Math Figure 5].

$$f_z(z) = \frac{1}{\sqrt{2\pi\sigma^2}} \exp\left[-\frac{(z-m)^2}{2\sigma^2}\right] \quad \text{[Math Figure 5]}$$

Figure 6:
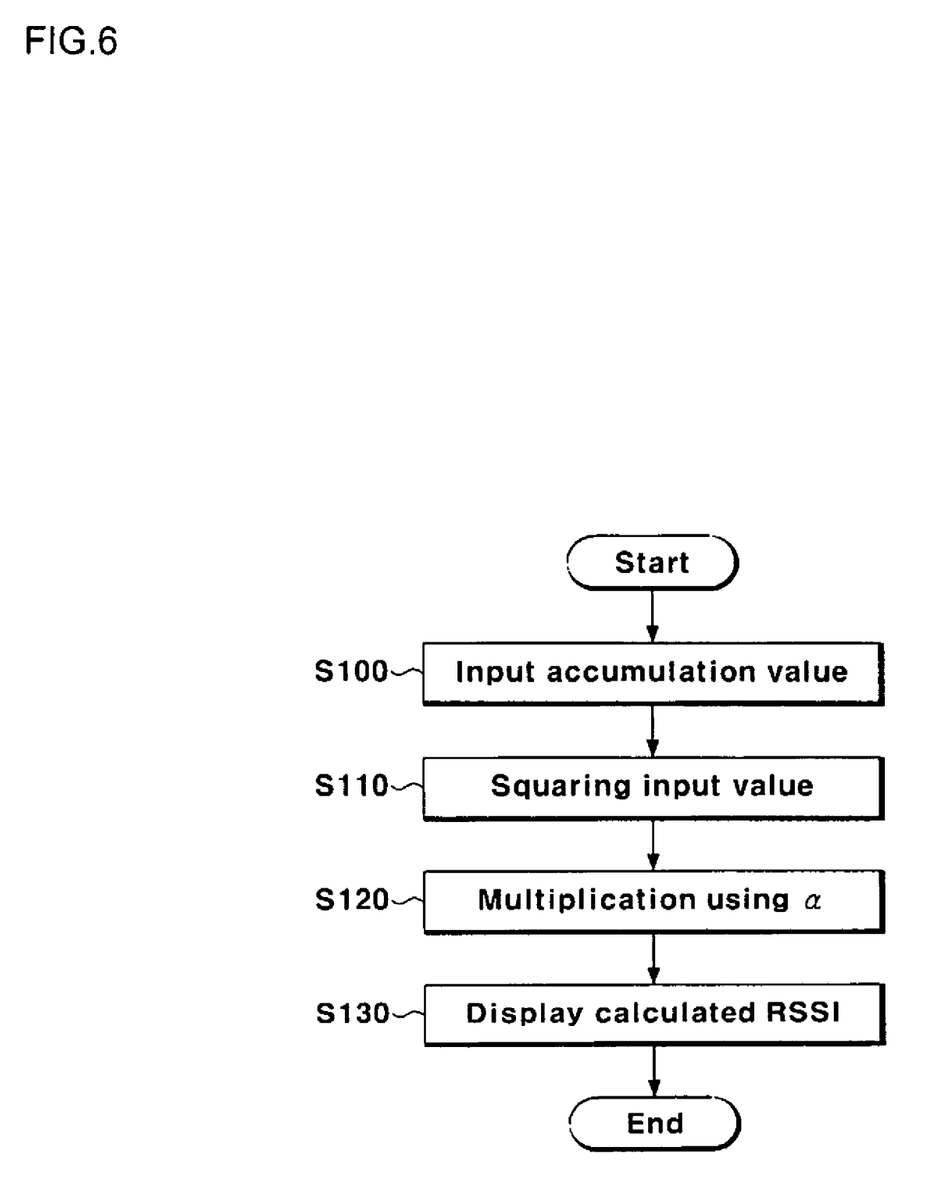
FIG. 6 is a flowchart of a method for estimating an RSSI according to the second exemplary embodiment of the present invention.

In this instance, with the relation of $$E\{|Z-m|\} = \sqrt{\frac{2}{\pi}}\sigma$$

is satisfied with respect to the Gaussian random variable Z, and [Math Figure 6] may be derived therefrom.

$$E^2\{|Z|\} = \frac{2}{\pi}\sigma^2 = 0.6366\sigma^2 \quad \text{[Math Figure 6]}$$

The RSSI estimation may be simply realized by using [Math Figure 6] for the Gaussian random variable Z.

By using [Math Figure 6], the input power of the ADCs 20 and 30 of [Math Figure 3] may be represented as signals at output ends of the ADCs 20 and 30 as shown in [Math Figure 7].

$$P_{in,ADC} = \quad \text{[Math Figure 7]}$$

$$\frac{2\sigma_i^2}{R} = \frac{2\sigma_o^2}{k^2 R} = \frac{2E^2\{|I_k \text{ or } Q_k|\}}{0.6366 k^2 R} = \frac{8V_c^2 E^2\{|I_k \text{ or } Q|\}}{0.6366(2^{2B})R} \text{ Watt}$$

This more accurate estimates the RSSI of a signal at a receive antenna connector. When the RSSI is estimated at the output end of the ADC rather that at the receive antenna connector, an analogue gain from the receive antenna connector to the ADC input end may cause inaccurate RSSI estimation. Therefore, if assumed that an analogue gain from the receive antenna connector to the ADC is $G_{rf}$, the RSSI at the receive antenna connector can be given by [Math Figure 8].

$$RSSI = 10^{-\frac{G_{rf}}{10}} \frac{1.2567 \times 10^4 V_c^2}{(2^{2B})R} \left(\frac{1}{N}\sum_{k=0}^{N-1} |I_{n,k} \text{ or } Q_{n,k}|\right)^2 mWatt \quad \text{[Math Figure 8]}$$

where $G_{rf}$ denotes an analogue gain from the receive antenna connector to the ADC input end, and $I_{n,k}$ or $Q_{n,k}$ denotes a k-th quantized value of the I or Q-branch in an n-th signal used for estimating the RSSI. That is, $I_{n,k}$ or $Q_{n,k}$ is an output signal of the ADC.

[Math Figure 8] may be simplified into [Math Figure 9].

$$RSSI = \alpha \left(\sum_{k=0}^{N-1} |I_{n,k} \text{ or } Q_{n,k}|\right)^2 mWatt, \quad \text{[Math Figure 9]}$$

$$\alpha = 10^{-\frac{G_{rf}}{10}} \frac{1.2567 \times 10^4 V_c^2}{(2^{2B})RN^2}$$

According to [Math Figure 9], one of the I-branch ADC and Q-branch ADC is selected, and an absolute value of an output signal of the selected ADC is obtained. The absolute value is accumulated for a given time period, and the accumulated absolute value is squared and then multiplied by α. An actual RSSI at the receive antenna connector is calculated through this process. Here, α is a known value.

Figure 3:
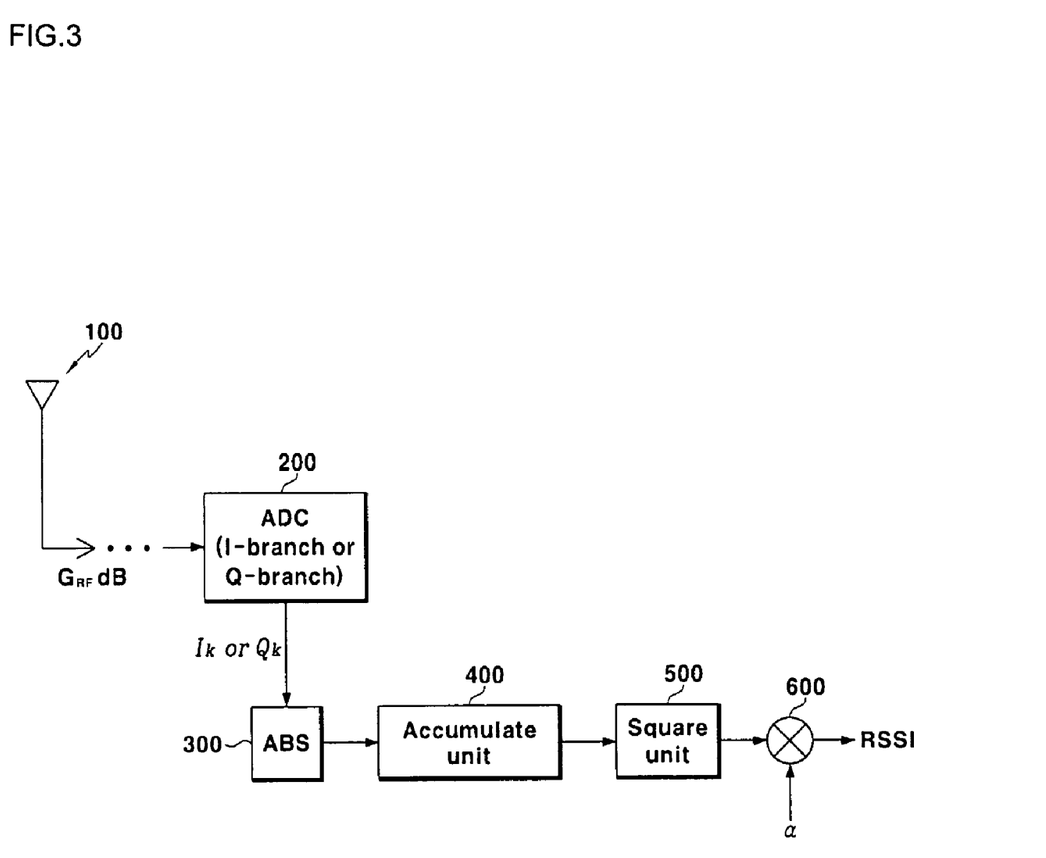
FIG. 3 is a block diagram of an RSSI estimation apparatus according to a first exemplary embodiment of the present invention.

FIG. 3 is a block diagram of the RSSI estimation apparatus according to the first exemplary embodiment of the present invention.

As shown in FIG. 3, the RSSI estimation apparatus includes a receive antenna 100, an ADC 200, an ABS 300, an accumulate unit 400, a square unit 500, and a multiply unit 600.

The receive antenna 100 receives a radio signal transmitted through a radio channel from a base station, and the ADC 200 selects one of I-branch and Q-branch signals transmitted through the receive antenna 100, converts the selected signal into the corresponding digital signal, and outputs the digital signal.

The ABS 300 calculates an absolute value of an output signal of the ADC 200 and outputs the absolute value.

The accumulate unit 400 accumulates an output signal of the ABS 300 and outputs an accumulated signal.

The square unit 500 squares the accumulated signal of the accumulate unit 400 and outputs a squared result.

The multiply unit 600 multiplying an output of the squaring unit 500 by α, which is calculated by [Math Figure 9] and stored in advance, and outputs a multiplied result as a signal used for estimating the RSSI. Herein, α has been calculated in advance by using input resistance R of the ADC 200, the number of input bits B of the ADC 200, an input clip level Vc of the ADC 200, and a circuit and line gain $G_{rf}$ from a connector of the receive antenna 100 to the ADC 200.

The above-described realization satisfies [Math Figure 9]. According to this realization, the number of ADCs is reduced compared to a conventional realization since only one of the I-branch and Q-branch signals from the receive antenna 100 is selected and quantized, and complexity of hardware is decreased since the multiply unit is used once for calculating wattage of an accumulated value rather than being used for calculating wattage for each sample. In addition, the RSSI estimated at the connector of the receive antenna 100 is more accurate, and at the same time, an accurate amount of wattage of the RSSI can be obtained in Watt (or mWatt) units by [Math Figure 9].

The RSSI is estimated using hardware according to the above embodiment. However, [Math Figure 9] may be calculated using software, excluding estimating an actual ADC. Thus, a method for estimating RSSI using hardware and software according to a second exemplary embodiment of the present invention will now be described.

Figure 4:
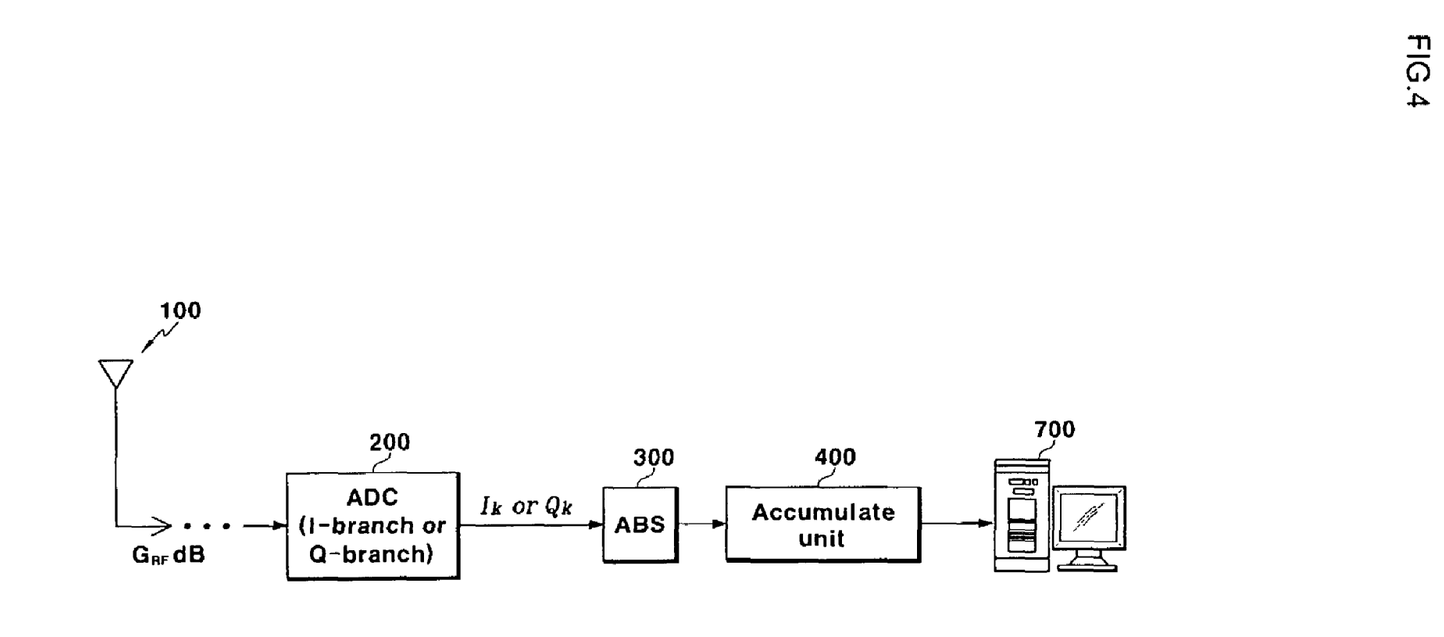
FIG. 4 is a block diagram of an RSSI estimation apparatus according to a second exemplary embodiment of the present invention.

FIG. 4 is a block diagram of an RSSI estimation apparatus according to the second exemplary embodiment of the present invention.

Since some elements of the RSSI estimation apparatus of the second exemplary embodiment of the present invention are similar to the elements of the RSSI estimation apparatus of the first exemplary embodiment of the present invention, the same reference numerals will be used for similar elements.

As shown in FIG. 4, the RSSI estimation apparatus includes a receive antenna 100, an ADC 200, an ABS 300, an accumulate unit 400, and a computer system 700.

Since functions of the receive antenna 100, ADC 200, ABS 300, and accumulate unit 400 of the second exemplary embodiment are the same as those of the first exemplary embodiment of the present invention, only different elements will now be described for ease of description.

An I-branch or Q-branch signal output from the receive antenna 100 is quantized into a digital signal by the ADC 200, the quantized digital signal is converted into an absolute value by the ABS 200, and the absolute value is accumulated for a given time period by the accumulate unit 400. The computer system 700 receives an accumulated value, estimates the RSSI by using the accumulated value, and displays the estimated RSSI to a user.

In other words, the computer system 700 squares the accumulated value of the accumulate unit 400 and then estimates the RSSI by multiplying a squared result by α given by [Math Figure 9]. Herein, we assume that α is calculated and stored in advance by using an input resistance R of the ADC 200, the number of input bits B of the ADC 200, and a circuit and line gain $G_{rf}$ from a connector of the receive antenna 100 to the ADC 200.

A general purpose computer system or a personal computer system may be used as the computer system 700, and they include the same components of FIG. 5.

The computer system 700 includes a system bus 710, a central processing unit (CPU) 720, a random access memory (RAM) 730, a read only memory (ROM) 740, an input/output (I/O) card 750, a hard disk drive (HDD) 760, a video card 770, and a monitor 780, as shown in FIG. 5.

The system bus 710 carries data, commands, and control signals to the CPU 720, the RAM 730, the ROM 740, the I/O card 750, the HDD 760, the video card 770, and the monitor 780, respectively. The RAM 720 is a memory for temporarily storing data, the ROM 730 is a memory for permanently storing data, and the I/O card 750 carries data from an external device to the computer system 700. The HDD 760 is an external storage for permanently storing data and is connected to the I/O card 750, and the monitor 780 displays text and graphics on a screen. The accumulate unit 400 is connected to the I/O card 750 through an I/O cable or wirelessly.

A method for estimating the RSSI according to the second exemplary embodiment of the present invention will now be described in more detail with reference to FIG. 6.

The CPU 720 of the computer system 700 performs a program command according to software for RSSI estimation and performs the corresponding operations to estimate the RSSI. The software is installed in the ROM 740 in advance.

The receive antenna 100 receives and outputs an I-branch or Q-branch signal, and the ADC 200 quantizes the signal into a digital signal. The ABS 200 converts the digital signal into an absolute value, and the accumulate unit 400 accumulates the absolute value for a given time period. The accumulated value is input to the computer system 700 through the I/O card 750, is carried to the RAM 730 by the system bus 710, and is stored in the RAM 730 by control of the CPU 720, in step S100.

The CPU 720 squares the accumulated values stored in the RAM 730 in step S110, and estimates the RSSI after multiplying a squared result by α given by [Math Figure 9] in step S120. It is assumed that α is calculated in advance by using an input resistance R of the ADC 200, the number of input bits B of the ADC 200, an input clip level Vc of the ADC 200, and a circuit and line gain $G_{rf}$ from a connector of the receive antenna 100 to the ADC 200, and is stored in a hard disk so the α can be read through the RAM 730 or the HDD 760.

The CPU 720 controls the monitor 780 connected to the video card 770 to display the RSSI estimated in the step S120 to a user such that the user acknowledges actual wattage of the estimated RSSI in Watts (or mWatts), in step S130.

According to the above-described realization that satisfies [Math Figure 9], the number of ADCs is reduced compared to the conventional realization since one of the I-branch and Q-branch signals from the receive antenna 100 is selected and quantized, and complexity of hardware is decreased since the multiply unit is used once for calculating wattage of an accumulated value rather than being used for calculating wattage for each sample. The complexity of hardware may be even more reduced by performing squaring and multiplying operations by using software. In addition, the RSSI estimated at the connector of the receive antenna 100 is more accurate and an accurate amount of wattage of the RSSI can be obtained in Waft (or mWatt) unit by [Math Figure 9].

While this invention has been described in connection with what is presently considered to be the most practical and preferred embodiment, it is to be understood that the invention is not limited to the disclosed embodiments, but on the contrary, is intended to cover various modifications and equivalent arrangements included within the spirit and scope of the appended claims.

For example, the technical range of the present invention is not limited to the structure of the computer system of FIG. 5. Thus, an apparatus capable of installing software therein and executing the software that performs receiving an accumulated value output from the accumulate unit 400 and calculating RSSI may replace the computer system of FIG. 5. The apparatus may include a desktop computer, a palmtop computer, a personal digital assistant (PDA), a mid-sized computer system, and a super-sized computer system.

According to the present invention, complexity of hardware is decreased by not performing a squaring operation for each sample within a signal received through a receive antenna.

In addition, squaring and multiplying operations are performed by using software to calculate an RSSI, and thus complexity of hardware is more reduced.

Further, the estimated RSSI becomes more likely the actual RSSI by being estimated at a connector of a receive antenna.

In addition, an exact amount of wattage of the estimated RSSI is obtained in Watts (or mWatts).

The invention claimed is:

1. An apparatus for estimating a received signal strength indicator (RSSI) of a signal transmitted/received in a wireless network, the apparatus comprising:
    an analogue/digital converter (ADC) quantizing one of an I (In-phase)-branch signal and a Q (Quadrature)-branch signal into a digital signal, the I-branch and Q-branch signals being extracted from a signal received through the wireless network;
    an absolute value calculating unit calculating an absolute value of the digital signal quantized by the ADC and outputting a calculation result;
    an accumulate unit accumulating an output of the absolute value calculating unit for a given time period and outputting an accumulated result;
    a square unit squaring an output of the accumulate unit and outputting a squared result; and
    a multiply unit multiplying an output of the square unit by a given value and outputting a multiplied result, the given value being determined based on the number of input bits, an input clip level, and input resistance of the ADC when the probability density functions at input and output signals of the ADC are approximately Gaussian with zero mean.

2. An apparatus for estimating a received signal strength indicator (RSSI) of a signal transmitted/received in a wireless network, the apparatus comprising:
    an analogue/digital converter (ADC) quantizing one of an I (In-phase)-branch signal and a Q (Quadrature)-branch signal into a digital signal, the I-branch and Q-branch signals being extracted from a signal received through the wireless network;
    an absolute value calculating unit calculating an absolute value of the digital signal quantized by the ADC and outputting a calculation result;
    an accumulate unit accumulating an output of the absolute value calculating unit for a given time period and outputting an accumulated result; and
    a computer system estimating an RSSI of the received signal by performing multiplication of an output value of the accumulate unit and a given value, the given value being determined based on the number of input bits, an input clip level, and an input resistance of the ADC when the probability density functions at input and output signals of the ADC are approximately Gaussian with zero mean.

3. The apparatus of claim 1, further comprising a receive antenna receiving a signal through a wireless network and outputting the received signal to the ADC, and
    wherein a gain from the receive antenna to the ADC is used when determining the given value.

4. The apparatus of claim 3, wherein variance of an output signal of the ADC is determined by multiplying variance of an input signal of the ADC and a value ($k^2$) determined by the number of input bits and an input clip level of the analogue/digital input signal.

5. The apparatus of claim 4, wherein the value ($k^2$) is determined by the following math figure:

$$k = \frac{2^{B-1}}{V_c}$$

where B denotes the number of input bits of the ADC, and Vc denotes an input clip level of the ADC.

6. The apparatus of claim 4, wherein power of the output signal of the ADC is determined based on variance of the output signal of the ADC.

7. The apparatus of claim 6, wherein power ($E^2$) of the output signal of the ADC is determined by the following math figure:

$$E^2 = \frac{2}{\pi}\sigma^2 = 0.6366\sigma^2$$

where $\sigma^2$ denotes variance of the output signal of the ADC.

8. The apparatus of claim 6, wherein the given value ($\alpha$) is determined by the following math figure:

$$\alpha = 10^{-\frac{G_{rf}}{10}} \frac{1.2567 \times 10^4 V_c^2}{(2^{2B})RN^2}$$

where B denotes the number of input bits of the ADC, R denotes an input resistance of the ADC, Vc denotes an input clip level of the ADC, $G_{rf}$ denotes a gain from the receive antenna to the ADC, and N denotes the number of samples accumulated by the accumulate unit for a given time period.

9. A method for estimating a received signal strength indicator (RSSI) of a signal transmitted/received through a wireless network, the method comprising:
    a) receiving an accumulated value as an input to estimate an RSSI of a signal received through a wireless network, the accumulated value being obtained by quantizing one of 1-branch and Q-branch signals extracted from the received signal into a digital signal, taking an absolute value of the digital signal, and accumulating the absolute value for a given time period;
    b) performing a squaring operation on the accumulated value; and
    c) estimating an RSSI of the received signal by performing a multiplication operation between a result of the squaring operation and a given value, the given value being determined based on the number of input bits, an input clip level, and an input resistance of the ADC when the probability density functions at input and output signals of the ADC are approximately Gaussian with zero mean.

10. The method of claim 9, further comprising, before a):

extracting one of I-branch and Q-branch signals from the signal received through the wireless network and quantizing the extracted signal into the corresponding digital signal;

calculating an absolute value of the quantized digital signal; and accumulating the absolute value for a given time period and outputting an accumulated result.

11. The method of claim 9, wherein a gain from a receive antenna to the ADC is used when determining the given value, the receive antenna receiving a signal through a wireless network and outputting the signal to the ADC.

12. A method for estimating a received signal strength indicator (RSSI) of an RSSI estimation apparatus having an analogue/digital converter (ADC) that quantizes a signal into a digital signal, the signal being one of an I (In-Phase)-branch and Q (Quadrature)-branch signals extracted from a signal received through a wireless network, wherein power at an input end of the ADC is determined by using the RSSI, the power at the input end being calculated using a signal at an output end of the ADC based on a first relation between variance of an output signal of the ADC and variance of an input signal of ADC when the probability density functions at input and output signals of the ADC are approximately Gaussian with zero mean and a second relation between the power and the variance in the probability density functions as a Gaussian random variable.

13. The method of claim 12, wherein the first relation is given by the following math figure:

$$\sigma_o^2 = k^2 \sigma_i^2$$

where $\sigma_i^2$ denotes variance of the input signal of the ADC. $\sigma_o^2$ denotes variance of the output signal of the ADC, and K is given by the following math figure:

$$k = \frac{2^{B-1}}{V_c}$$

where B denotes the number of input bits of the ADC, and Vc denotes an input clip level when an output of the ADC is saturated.

14. The method of claim 12, wherein the second relation is given by the following math figure:

$$E^2 = \frac{2}{\pi}\sigma^2 = 0.6366\sigma^2$$

where E denotes power in a probability density function of a Gaussian random variable, and $\sigma^2$ denotes variance of the probability density function of the Gaussian random variable.

15. The method of claim 12, wherein the RSSI estimation apparatus further comprises a receive antenna receiving a signal through a wireless network and outputting the signal to the ADC, wherein a gain from the receive antenna to the ADC is used when estimating the RSSI.

16. A recording medium storing a program that realizes a method for estimating a received signal strength indication (RSSI) of a signal received through a wireless network, the program comprising:

a) a function of receiving an accumulated value as an input for estimating an RSSI of a signal received through a wireless network, the accumulated value being obtained by quantizing one of I (In-Phase)-branch and Q (Quadrature)-branch signals extracted from the received signal into a digital signal, taking an absolute value of the quantized digital signal, and accumulating the absolute value for a given time period;

b) a function performing a squaring operation on the accumulated value; and c) a function calculating an RSSI of the received signal by performing a multiplication operation between a result of the squaring operation and a given value, wherein the given value is determined based on the number of input bits, an input clip level, and an input resistance of an analogue/digital converter (ADC) when the probability density functions at input and output signals of the ADC are approximately Gaussian with zero mean.

17. A recording medium storing a program the realizes a method for estimating a received signal strength indicator (RSSI) of an RSSI estimation apparatus estimating an RSSI of a signal received through a wireless network, the RSSI estimation apparatus including an analogue/digital converter (ADC) that quantizes one of I (In-Phase)-branch and Q (Quadrature)-branch signals extracted from a signal received through a wireless network, wherein power at an input end of the ADC using the RSSI, the power at the input end being calculated using a signal at an output end of the ADC based on a first relation between variance of an output signal of the ADC and variance of an input signal of ADC when the probability density functions at input and output signals of the ADC are approximately Gaussian with zero mean and a second relation between the power and the variance in the probability density functions as a Gaussian random variable.

* * * * *